United States Patent
Yi et al.

(10) Patent No.: US 8,995,432 B2
(45) Date of Patent: Mar. 31, 2015

(54) METHOD AND APPARATUS FOR MONITORING DOWNLINK CONTROL CHANNEL

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 13/980,344

(22) PCT Filed: Mar. 30, 2012

(86) PCT No.: PCT/KR2012/002379
§ 371 (c)(1),
(2), (4) Date: Jul. 18, 2013

(87) PCT Pub. No.: WO2012/134219
PCT Pub. Date: Oct. 4, 2012

(65) Prior Publication Data
US 2013/0301421 A1 Nov. 14, 2013

Related U.S. Application Data

(60) Provisional application No. 61/469,821, filed on Mar. 31, 2011.

(51) Int. Cl.
*G01R 31/08* (2006.01)
*H04W 76/04* (2009.01)
*H04W 52/02* (2009.01)

(52) U.S. Cl.
CPC ........ *H04W 76/048* (2013.01); *H04W 52/0216* (2013.01)

USPC ........................................... 370/352; 370/241

(58) Field of Classification Search
None
See application file for complete search history.

(56) References Cited

U.S. PATENT DOCUMENTS

| 2008/0132230 A1 | 6/2008 | Marinier et al. |
| 2008/0232310 A1 | 9/2008 | Xu |
| 2009/0262648 A1 | 10/2009 | Chun et al. |
| 2009/0296643 A1 | 12/2009 | Cave et al. |
| 2010/0330992 A1 * | 12/2010 | Bhattacharjee et al. ...... 455/436 |

(Continued)

FOREIGN PATENT DOCUMENTS

KR    10-2011-0002818 A    1/2011

OTHER PUBLICATIONS

R2-106133, "Introduction of Carrier Aggregation," 3GPP TSG-RAN2 Meeting, #72, Nov. 19, 2010, See Section 5.7 "Discontinuous Reception (DRX)", pp. 1-51.

*Primary Examiner* — Robert Wilson
(74) *Attorney, Agent, or Firm* — McKenna Long & Aldridge LLP

(57) ABSTRACT

A method and apparatus for monitoring a downlink control channel in a wireless communication system is provided. A wireless device receives a discontinuous reception (DRX) command from a base station. The DRX command indicates an activation of at least one DRX pattern from a plurality of DRX patterns. Each of the plurality of DRX patterns includes an on-duration which specifies at least one subframes to monitor a downlink control channel within a DRX cycle. The wireless device monitors the downlink control channel in at least one subframe which belongs to on-duration of the at least one activated DRX pattern.

15 Claims, 6 Drawing Sheets

(56) References Cited

U.S. PATENT DOCUMENTS

2011/0002281 A1    1/2011  Terry et al.
2011/0134782 A1*   6/2011  Akimoto et al. ............ 370/252
2011/0199934 A1*   8/2011  Olofsson et al. ............ 370/252
2013/0301466 A1*  11/2013  Nenner ........................ 370/252
2014/0086110 A1*   3/2014  Lee et al. .................... 370/280
2014/0119198 A1*   5/2014  Lee et al. .................... 370/241

* cited by examiner

METHOD AND APPARATUS FOR MONITORING DOWNLINK CONTROL CHANNEL

This application is a 35 USC §371 National Stage entry of International Application No. PCT/KR2012/002379 filed on Mar. 30, 2012, and claims priority to U.S. Provisional Application No. 61/469,821 filed on Mar. 31, 2011, all of which are incorporated by reference in their entirety herein.

TECHNICAL FIELD

The present invention relates to wireless communications, and more particularly, to a method and apparatus for monitoring a downlink control channel in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Discontinuous reception (DRX) is a method for reducing battery consumption by allowing a user equipment (UE) to discontinuously monitor a downlink channel. When the DRX is configured, the UE discontinuously monitors the downlink channel. Otherwise, the UE continuously monitors the downlink channel.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel. There is a need for a method for operating the DRX in a more flexible manner.

DISCLOSURE

Technical Problem

The present invention provides a method and apparatus for monitoring a downlink control channel in a wireless communication system.

Technical Solution

In an aspect, a method for monitoring a downlink control channel in a wireless communication system is provided. The method includes receiving a discontinuous reception (DRX) command from a base station, the DRX command indicating an activation of at least one DRX pattern from a plurality of DRX patterns, each of the plurality of DRX patterns including an on-duration which specifies at least one subframes to monitor a downlink control channel within a DRX cycle, and monitoring the downlink control channel in at least one subframe which belongs to on-duration of the at least one activated DRX pattern.

The method may further includes starting an inactivity timer wherein the downlink control channel indicates a transmission or reception of data and monitoring the downlink control channel continuously while the inactivity timer is running.

The DRX command may be received while the inactivity timer is running.

The method may further include starting a DRX cycle timer upon receiving the DRX command, wherein the downlink control channel is monitored while the DRX cycle timer is running.

The DRX command may include a plurality of bits, each bit corresponding to each DRX pattern to be activated or deactivated.

In another aspect, a wireless device for monitoring a downlink control channel in a wireless communication system is provided. The wireless device includes a radio frequency unit for receiving a radio signal and a processor, operatively coupled with the radio frequency unit, configured to receive a discontinuous reception (DRX) command from a base station, the DRX command indicating an activation of at least one DRX pattern from a plurality of DRX patterns, each of the plurality of DRX patterns including an on-duration which specifies at least one subframes to monitor a downlink control channel within a DRX cycle, and monitor the downlink control channel in at least one subframe which belongs to on-duration of the at least one activated DRX pattern.

Advantageous Effects

Discontinuous reception (DRX) can be configured flexibly. Battery consumption of a user equipment can be reduced when monitoring a control channel.

MODE FOR INVENTION

Figure 1:
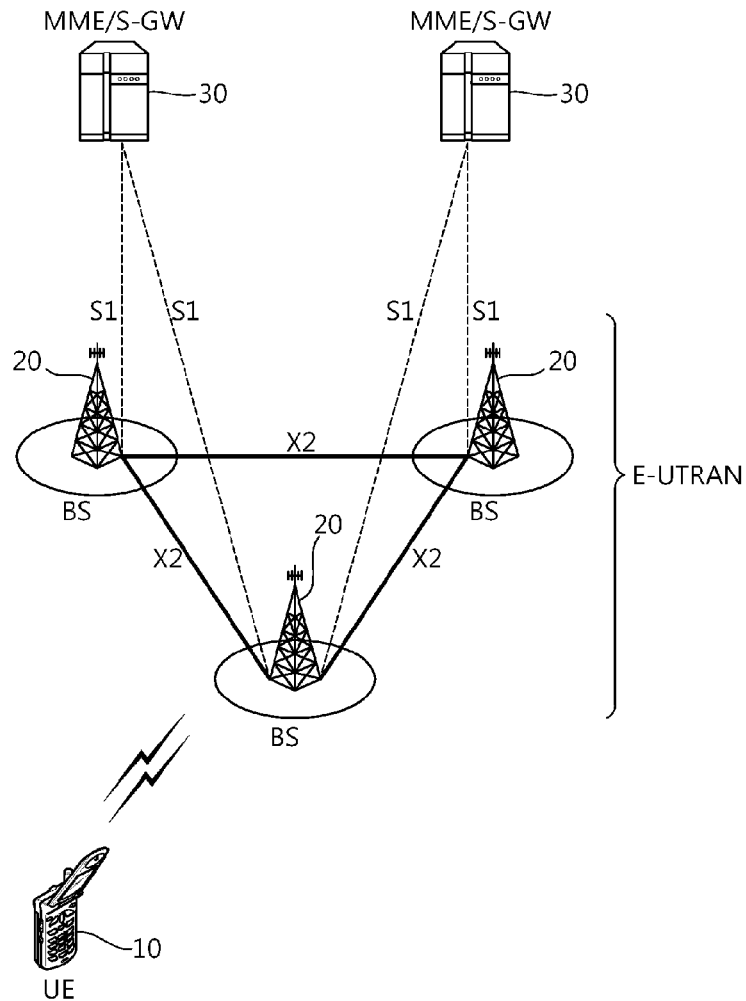
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
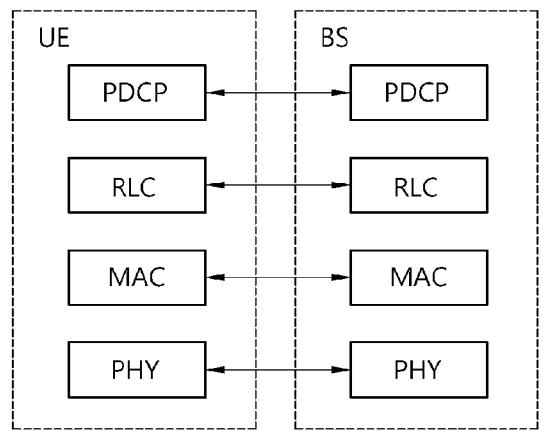
FIG. 2 is a diagram showing a radio protocol architecture for a user plane.
Figure 3:
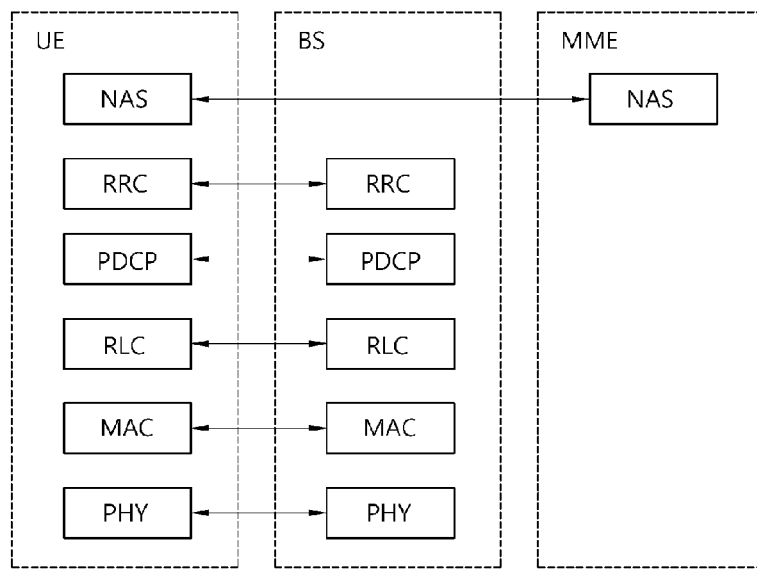
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

As disclosed in 3GPP TS 36.211 V8.7.0, the 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Now, discontinuous reception (DRX) in 3GPP LTE will be described.

The DRX is a method for reducing battery consumption of a UE by allowing the UE to discontinuously monitor a downlink channel.

Figure 4:
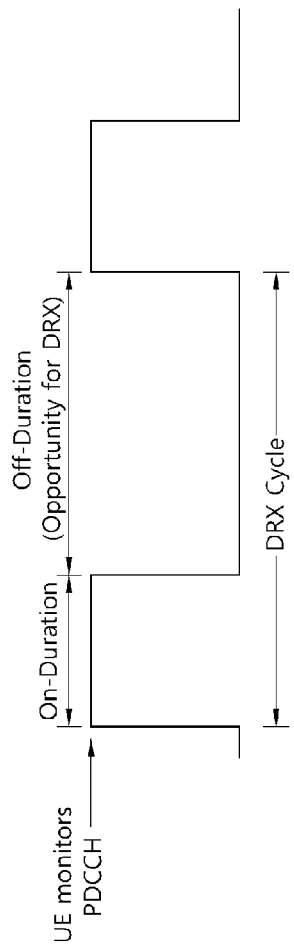
FIG. 4 shows a DRX cycle.

FIG. 4 shows a DRX cycle.

A DRX cycle specifies the periodic repetition of the on-duration followed by a possible period of inactivity. The DRX cyclic includes an on-duration and an off-duration. The on-duration is a duration in which a UE monitors a PDCCH within the DRX cycle.

When the DRX is configured, the UE may monitor the PDCCH only in the on-duration and may not monitor the PDCCH in the off-duration.

An onDuration timer is used to define the on-duration. The on-duration can be defined as a duration in which the onDuration timer is running. The onDuration timer may specify the number of consecutive PDCCH-subframe(s) at the beginning of a DRX Cycle. The PDCCH-subframe specifies a subframe in which the PDCCH is monitored.

In addition to the DRX cycle, a duration in which the PDCCH is monitored can be further defined. A duration in which the PDCCH is monitored is collectively referred to as an active time.

A drx-Inactivity timer deactivates the DRX. If the drx-Inactivity timer is running, the UE continuously monitors the PDCCH irrespective of the DRX cycle. The drx-Inactivity timer starts upon receiving an initial UL grant or DL grant on the PDCCH. The drx-Inactivity timer may specify the number of consecutive PDCCH-subframe(s) after successfully decoding a PDCCH indicating an initial UL or DL user data transmission for this UE.

A HARQ RTT timer defines a minimum duration in which the UE expects HARQ retransmission. The HARQ RTT timer may specify the minimum amount of subframe(s) before a DL HARQ retransmission is expected by the UE.

A drx-Retransmission timer defines a duration in which the UE monitors the PDCCH while expecting DL retransmission. The drx-Retransmission timer may specify the maximum number of consecutive PDCCH-subframe(s) for as soon as a DL retransmission is expected by the UE. After initial DL transmission, the UE starts the HARQ RTT timer. When an error is detected for the initial DL transmission, the UE transmits NACK to a BS, stops the HARQ RTT timer, and runs the drx-Retransmission timer. The UE monitors the PDCCH for DL retransmission from the BS while the drx-Retransmission timer is running.

An Active Time can include an on-duration in which the PDCCH is periodically monitored and a duration in which the PDCCH is monitored due to an event occurrence.

When a DRX cycle is configured, the Active Time includes the time while:
 onDuration timer or drx-Inactivity timer or drx-Retransmission timer or mac-ContentionResolution timer is running; or
 a Scheduling Request is sent on PUCCH and is pending; or
 an uplink grant for a pending HARQ retransmission can occur and there is data in the corresponding HARQ buffer; or
 a PDCCH indicating a new transmission addressed to the C-RNTI of the UE has not been received after successful reception of a Random Access Response for the preamble not selected by the UE.

Figure 5:
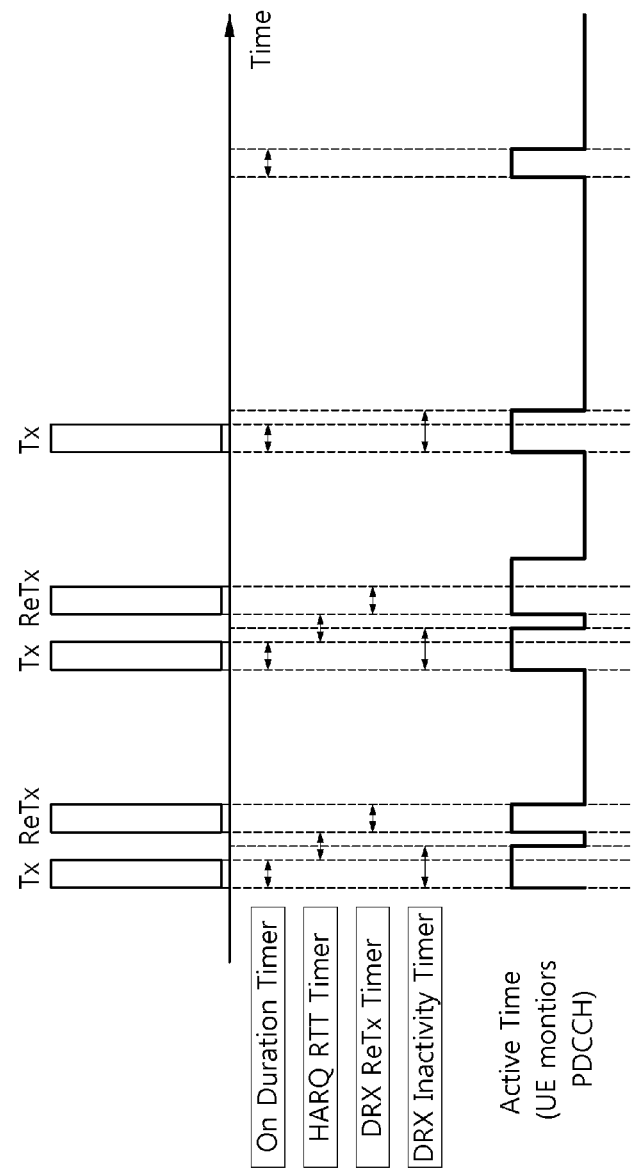
FIG. 5 shows active time at 3GPP LTE.

FIG. 5 shows active time at 3GPP LTE.

When DRX is configured, the UE shall for each subframe:
 if a HARQ RTT Timer expires in this subframe and the data of the corresponding HARQ process was not successfully decoded:
  start the drx-Retransmission timer for the corresponding HARQ process.
 if a DRX Command MAC CE (control element) is received:
  stop onDuration timer and drx-Inactivity timer.
 if drx-InactivityTimer expires or a DRX Command MAC CE is received in this subframe:
  if the Short DRX cycle is configured:
   start or restart drx-ShortCycle timer and use the Short DRX Cycle.
  else:
   use the Long DRX cycle.
 if drx-ShortCycle timer expires in this subframe:
  use the Long DRX cycle.
 If the Short DRX Cycle is used and [(SFN*10)+subframe number] modulo (shortDRX-Cycle)=(drxStartOffset) modulo (shortDRX-Cycle); or
 if the Long DRX Cycle is used and [(SFN*10)+subframe number] modulo (longDRX-Cycle)=drxStartOffset:
  start onDuration timer.
 during the Active Time, for a PDCCH-subframe, if the subframe is not required for uplink transmission for half-duplex FDD UE operation and if the subframe is not part of a configured measurement gap:
  monitor the PDCCH;
  if the PDCCH indicates a DL transmission or if a DL assignment has been configured for this subframe:
   start the HARQ RTT timer for the corresponding HARQ process;
   stop the drx-Retransmission timer for the corresponding HARQ process.
  if the PDCCH indicates a new transmission (DL or UL):
   start or restart drx-Inactivity timer.

The DRX cycle has two types, i.e., a long DRX cycle and a short DRX cycle. The long DRX cycle which has a long period can minimize battery consumption of the UE. The short DRX cyclic which has a short period can minimize a data transmission delay.

Figure 6:
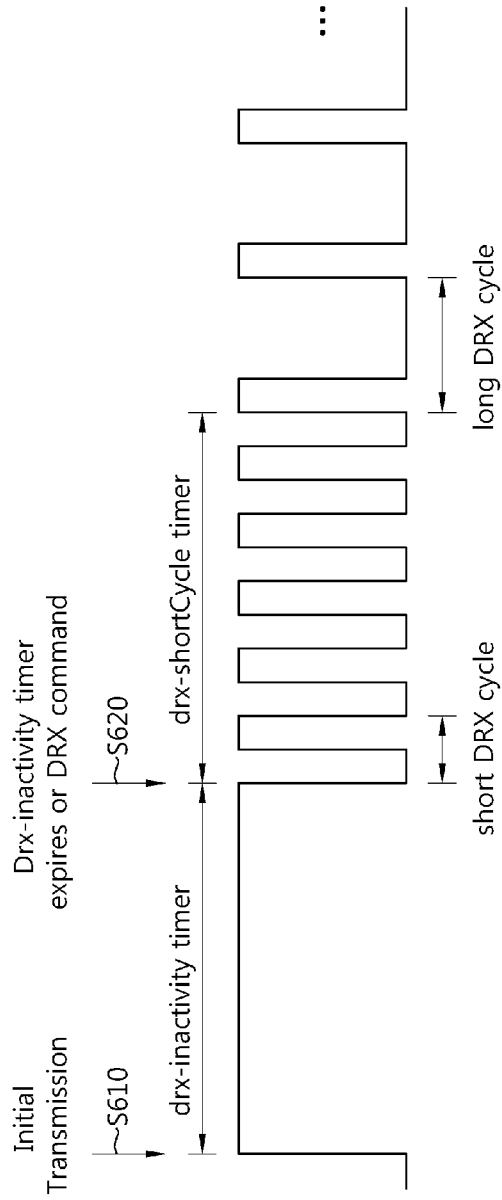
FIG. 6 shows an example of a transition of a DRX cycle.

FIG. 6 shows an example of a transition of a DRX cycle.

Upon receiving initial transmission from an eNB, a drx-Inactivity timer (also referred to as a first timer or an inactivity timer) starts (step S610). A UE continuously monitors a PDCCH while the drx-Inactivity timer is running.

If the drx-Inactivity timer expires or if a DRX command is received from the eNB, the UE transitions to a short DRX cycle (step S620). Then, the drx-shortCycle timer (also referred to as a second timer or a DRX cycle timer) starts.

The DRX command can be transmitted as a MAC CE, and can be called a DRX indicator that indicates a transition to the DRX. The DRX command MAC CE is identified through a long channel ID (LCID) of a MAC PDU subheader.

While the drx-shortCycle timer is running, the UE operates in the short DRX cycle. If the drx-shortCycle timer expires, the UE transitions to a long DRX cycle.

If the short DRX cyclic is pre-set, the UE transitions to the short DRX cycle. If the short DRX cyclic is not pre-set, the UE can transition to the long DRX cycle.

A value of HARQ RTT timer is fixed to 8 ms (or 8 subframes). Other timer values (i.e., an onDuration timer, a drx-Inactivity timer, a drx-Retransmission timer, a mac-ContentionResolution timer, etc.) can be determined by the eNB through an RRC message. The eNB can configure the long DRX cycle and the short DRX cycle through the RRC message.

In the above process, the DRX command MAC CE is a MAC CE used when the eNB commands the UE to transition to a DRX state. As shown in the above process, upon receiving the DRX command MAC CE from the eNB, if the short DRX cycle is configured, the UE transitions to a short DRX state, and otherwise transitions to a long DRX state.

The long DRX cycle and the short DRX cycle are for exemplary purposes only, and thus an additional DRX cycle can be configured.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel.

A method for operating the DRX in a more flexible manner is required in an environment in which various applications are used.

In order to optimize battery consumption of the UE, it is proposed to configure a plurality of DRX patterns by the UE.

The DRX pattern may include a DRX cycle. Alternatively, the DRX pattern may include only an on-duration which is a duration in which a PDCCH is monitored.

The DRX pattern may be configured per DRB. The DRX pattern may depend on a traffic characteristic of DRB.

The DRX pattern may be configured per carrier or per serving cell.

When the eNB sets the DRB to the UE, the eNB can provide a DRX pattern related to the DRB. The DRX pattern can be identified by a DRX pattern ID. The DRX pattern ID can be reported by the eNB to the UE.

Figure 7:
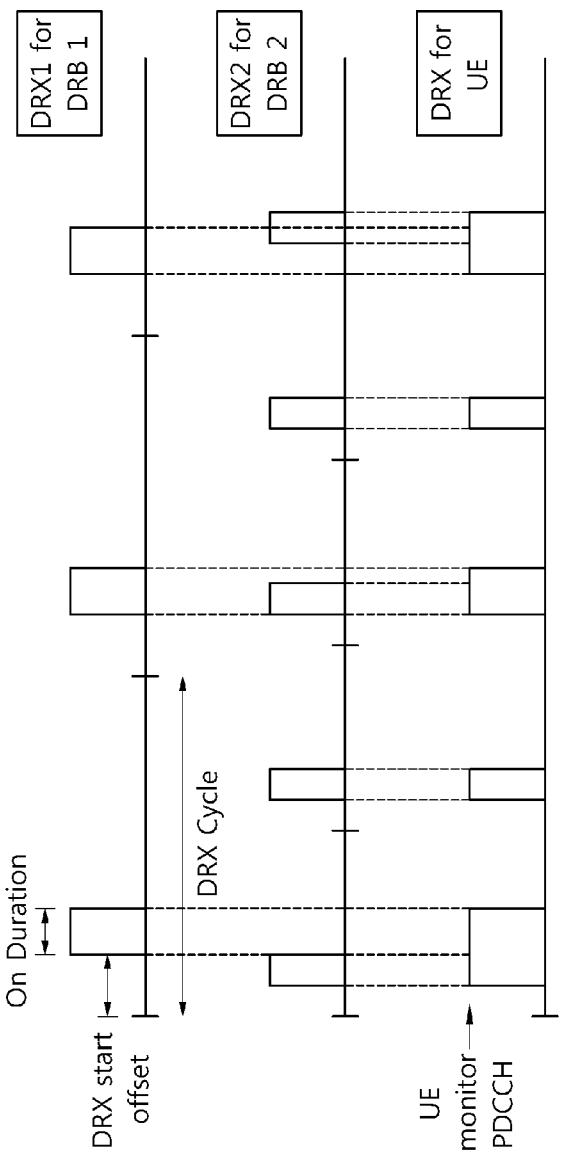
FIG. 7 shows a DRX operation according to an embodiment of the present invention.

FIG. 7 shows a DRX operation according to an embodiment of the present invention.

Assume that a DRX pattern DRX1 is set for a DRB1, and a DRX pattern DRX2 is set for a DRB2. The number of DRBs and the number of DRX patterns are for exemplary purposes only.

An operation is performed at a DRX level depending on a plurality of configured DRX pattern of a UE. A DRX cycle of the DRX level is called an activated DRX cycle.

An on-duration of the activated DRX cycle can be defined as a union of the on-duration. The 'union' may imply monitoring of a PDCCH in all subframes belonging to on-durations of a plurality of DRX patterns. For example, the UE can monitor the PDCCH in all subframes belonging to the DRX1 and the DRX2.

A drx-Inactivity timer, a HARQ RTT timer, and a drx-Retransmission timer can be set by any one of the plurality of DRX patterns.

A long DRX cyclic can be defined as the longest DRX cycle among the plurality of DRX patterns. A short DRX cycle can be defined as the shortest DRX cycle among the plurality of DRX patterns.

A BS can control the plurality of DRX patterns. This is called an extended DRX (EDRX) command in comparison with the existing DRX command. The conventional DRC command simply instructs a transition to the DRX, but the EDRX command differs from the existing DRX command in a sense that the plurality of configured DRX patterns are activated or deactivated.

Figure 8:
FIG. 8 shows an example of a MAC CE for an EDRX command.
Figure 8:
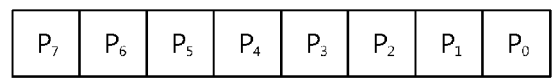

FIG. 8 shows an example of a MAC CE for an EDRX command.

An LCID of a MAC subheader is used to identify the EDRX command. A bitmap can be used for activation or deactivation of a plurality of DRX patterns. For example, a bit P0 may correspond to a 1st DRX pattern, and a bit P1 may correspond to a 2nd DRX pattern. If a bit Pn is 0, a (n+1)th DRX pattern can be deactivated, and if the bit Pn is 1, the (n+1)th DRX pattern can be activated.

The number of bits of a bitmap is for exemplary purposes only. The EDRX command can be transmitted through a PDCCH or an RRC message instead of a MAC CE.

Figure 9:
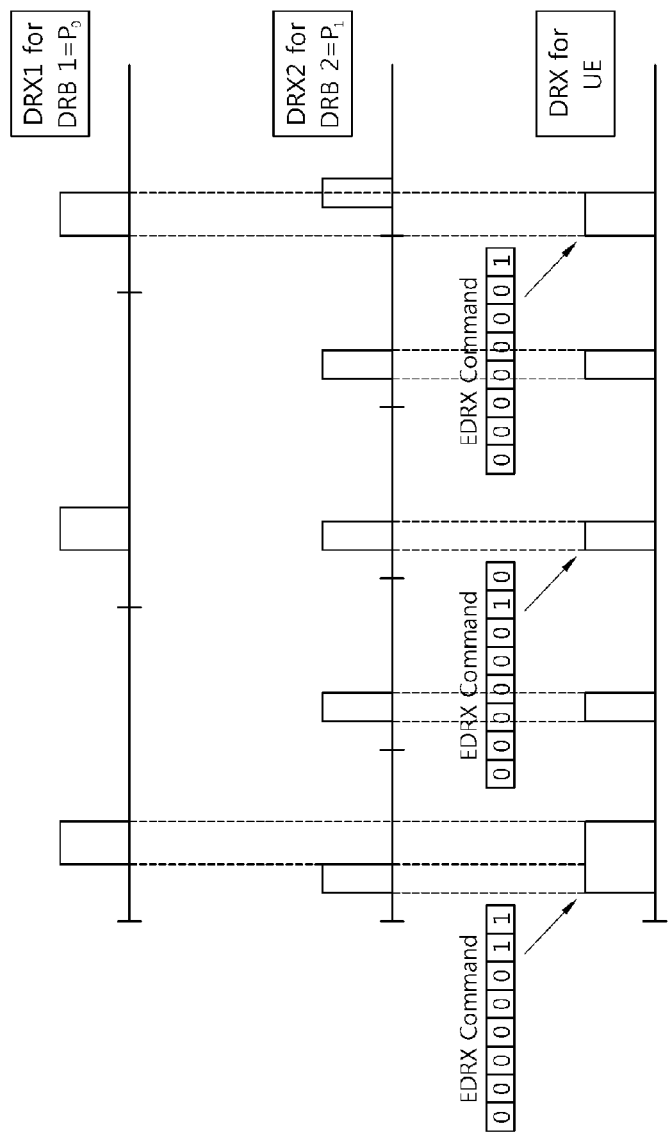
FIG. 9 shows a DRX operation using an EDRX command.

FIG. 9 shows a DRX operation using an EDRX command.

Assume that a bit P0 corresponds to a DRX1, and a bit P1 corresponds to a DRX2.

Upon receiving an EDRX command '00000011', both the DRX1 and the DRX2 are activated. A UE monitors a PDCCH in an on-duration defined as a union of the DRX1 and the DRX2.

Upon receiving the EDRX command '00000010', only the DRX2 is activated. The UE monitors the PDCCH in an on-duration of the DRX2.

Upon receiving an EDRX command '00000001', only the DRX1 is activated. The UE monitors the PDCCH in an on-duration of the DRX1.

An optimal DRX pattern is configured for each RB, and a plurality of DRX patterns can be selectively used by considering an actually used RB. When a plurality of services are simultaneously provided, battery consumption can be optimized while maintaining an always-on characteristic.

The aforementioned embodiments may be applied to a frequency division duplex (FDD) or time division duplex (TDD). In FDD, UL subframes and DL subframes use different frequency. In TDD, UL subframes and DL subframes use same frequency. In 3GPP TDD, a radio frame includes DL subframes and UL subframes. Table 1 show an example of UL-DL configuration of 3GPP LTE.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes DL subframe, 'U' denotes UL subframe, 'S' denotes special subframe.
If UL-DL configuration is received from a BS, a UE can know which subframe is DL or UL in accordance with the UL-DL configuration.

Special subframe includes Downlink Pilot Time Slot (DwPTS), Guard Period (GP) and Uplink Pilot Time Slot (UpPTS). DwPTS is used for initial cell search and DL synchronization. UpPTS is used for UL synchronization. GP is used to remove UL interference.

It is assumed that there are a plurality of service cells and each serving has each DRX pattern. For FDD, DRX at each serving cell is operated in accordance with each DRX pattern. For TDD, union of DRX pattern is used for all scheduling serving cells. The union of DRX pattern may include subframe with DwPTS.

Although the aforementioned embodiment shows the DRX operation of the UE for example, the proposed invention is applicable to a DRX operation of a machine to machine (M2M) device or a machine-type communication (MTC) device. MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 10:
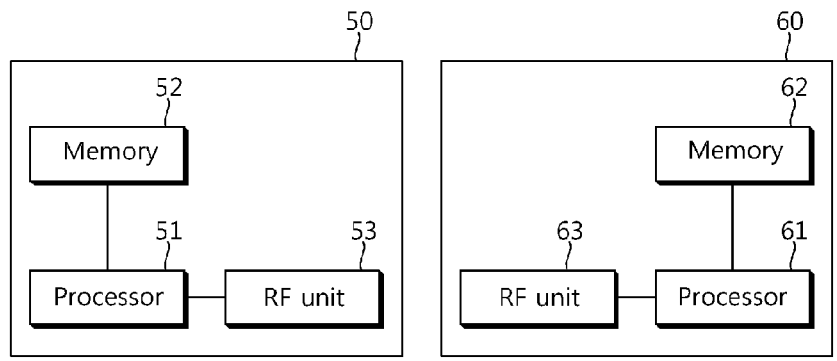
FIG. 10 is a block diagram showing a wireless communication system according to an embodiment of the present invention.

FIG. 10 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the embodiments of FIG. 7 to FIG. 9, the operation of the BS can be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the embodiments of the FIG. 7 to FIG. 9, the operation of the UE can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for monitoring a downlink control channel in a wireless communication system, performed by a wireless device, the method comprising:
   receiving a discontinuous reception (DRX) command from a base station, the DRX command indicating an activation of at least one DRX pattern from a plurality of DRX patterns, each of the plurality of DRX patterns including an on-duration which specifies at least one subframes to monitor a downlink control channel within a DRX cycle; and
   monitoring the downlink control channel in at least one subframe which belongs to on-duration of the at least one activated DRX pattern.

2. The method of claim 1, further comprising:
   starting an inactivity timer wherein the downlink control channel indicates a transmission or reception of data; and
   monitoring the downlink control channel continuously while the inactivity timer is running.

3. The method of claim 2, wherein the DRX command is received while the inactivity timer is running.

4. The method of claim 3, further comprising:
   starting a DRX cycle timer upon receiving the DRX command, wherein the downlink control channel is monitored while the DRX cycle timer is running.

5. The method of claim 1, wherein the DRX command includes a plurality of bits, each bit corresponding to each DRX pattern to be activated or deactivated.

6. The method of claim 5, wherein the DRX command is received via a medium access control (MAC) control element (CE).

7. The method of claim 1, wherein the downlink control channel is a physical downlink control channel (PDCCH).

8. The method of claim 1, wherein the plurality of DRX patterns are configured by using a Radio Resource Control (RRC) message.

9. A wireless device for monitoring a downlink control channel in a wireless communication system, comprising:
   a radio frequency unit for receiving a radio signal; and
   a processor, operatively coupled with the radio frequency unit, configured to:
   receive a discontinuous reception (DRX) command from a base station, the DRX command indicating an activation of at least one DRX pattern from a plurality of DRX patterns, each of the plurality of DRX patterns including an on-duration which specifies at least one subframes to monitor a downlink control channel within a DRX cycle; and monitor the downlink control channel in at least one subframe which belongs to on-duration of the at least one activated DRX pattern.

10. The wireless device of claim 9, wherein the processor is configured to:

start an inactivity timer wherein the downlink control channel indicates a transmission or reception of data; and monitor the downlink control channel continuously while the inactivity timer is running.

11. The wireless device of claim 10, wherein the DRX command is received while the inactivity timer is running.

12. The wireless device of claim 11, the processor is configured to:

start a DRX cycle timer upon receiving the DRX command, wherein the downlink control channel is monitored while the DRX cycle timer is running.

13. The wireless device of claim 9, wherein the DRX command includes a plurality of bits, each bit corresponding to each DRX pattern to be activated or deactivated.

14. The wireless device of claim 13, wherein the DRX command is received via a medium access control (MAC) control element (CE).

15. The wireless device of claim 9, wherein the downlink control channel is a physical downlink control channel (PDCCH).

* * * * *